United States Patent

Clarke

[15] 3,687,897

[45] Aug. 29, 1972

[54] PREPARATION OF OXAZOLIDINONES BY REACTING AN ISOCYANATE, OR ISOTHIOCYANATE WITH AN EPOXIDE IN THE PRESENCE OF A PHOSPHONIUM HALIDE ACID, ESTER, OR ACID ESTER OF THE ELEMENT C

[72] Inventor: James A. Clarke, Lake Jackson, Tex. 77566

[22] Filed: June 22, 1970

[21] Appl. No.: 48,524

[73] Assignee: The Dow Chemical Company, Midland, Mich.

[52] U.S. Cl. ............... 260/59, 252/431, 260/47 EP, 260/77.5 AB, 260/307 A
[51] Int. Cl. ............................................. C08g 30/06
[58] Field of Search ........... 260/47 EP, 47 EC, 59, 79, 77.5AB, 260/2 EP, 2 A, 2 BP, 307 A; 252/431 P

[56] References Cited

UNITED STATES PATENTS

| | | |
|---|---|---|
| 2,928,803 | 3/1960 | Belanger et al. ........ 260/47 EC |
| 3,020,262 | 2/1962 | Speranza ................ 260/47 EP |
| 3,305,494 | 2/1967 | Schramm .............. 260/47 EP |
| 3,334,110 | 8/1967 | Schramm .............. 260/47 EP |
| 3,477,990 | 11/1969 | Dante et al. ........... 260/47 EP |

*Primary Examiner*—William H. Short
*Assistant Examiner*—T. Pertilla
*Attorney*—Griswold & Burdick, Raymond B. Ledlie and James G. Carter

[57] ABSTRACT

Oxazolidinones are prepared by reacting an organic isocyanate such as toluene diisocyanate with a vicinal epoxide such as the diglycidyl ether of p,p'-isopropylidine diphenol in the presence of a phosphonium catalyst such as tetrabutyl phosphonium bromide. The oxazolidinone compounds prepared herein are known to be useful as chemical intermediates and in the manufacture of resins and plastics.

10 Claims, No Drawings

PREPARATION OF OXAZOLIDINONES BY REACTING AN ISOCYANATE, OR ISOTHIOCYANATE WITH AN EPOXIDE IN THE PRESENCE OF A PHOSPHONIUM HALIDE ACID, ESTER, OR ACID ESTER OF THE ELEMENT C

This invention relates to a process for the preparation of oxazolidinones which comprises reacting a vicinal epoxide containing compound with an organic isocyanate or isothiocyanate containing compound in the presence of a phosphonium catalyst.

Oxazolidinone compounds are well known in the art. They are usually prepared by reacting an isocyanate or isothiocyanate with a vicinal epoxide in the presence of such catalysts as alkali metal halides, tertiary amines or quaternary ammonium halides. Primary and secondary aliphatic alcohols are frequently employed as co-catalysts.

The oxazolidinone products prepared by the process of this invention contain the following general structure:

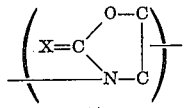

wherein X is sulfur or oxygen.

It has now been unexpectedly discovered that certain phosphonium compounds may be employed as catalysts in the preparation of oxazolidinones from vicinal epoxides and organic isocyanates or isothiocyanates.

Suitable epoxide containing compounds which may be employed in the process of this invention include vicinal monoepoxides such as for example ethylene oxide, 1,2-propylene oxide, 1,2-butylene oxide, 2,3-butylene oxide, styrene oxide, methyl styrene oxide and the like; polyepoxides, such as the polyglycidyl ethers of polyhydric compounds such as, for example, polyhydric phenols, bisphenols, polyoxyalkylene glycols, polyhydric aliphatic compounds such as glycerine, neopentyl glycol, halogenated neopentyl glycols and the like. Suitable such polyglycidyl ether compounds may be represented by the following general formulas:

A

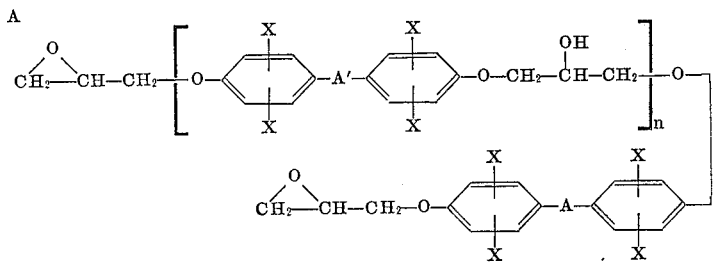

wherein A' is selected from the group consisting of an alkylene or alkylidine group having from one to four carbon atoms,

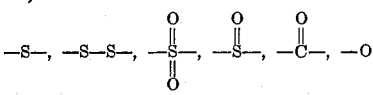

X is hydrogen or a halogen and $n$ is an integer having an average value of from about 0 to about 10;

B

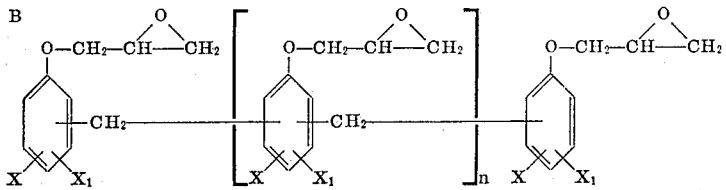

wherein X and $X_1$ are independently selected from the group consisting of hydrogen, an alkyl group having from about one to about four carbon atoms, and a halogen and $n$ is an integer having an average value of from about 0.1 to about 4;

C

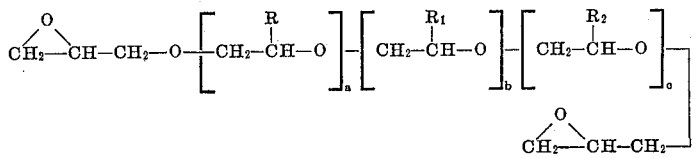

wherein R, $R_1$ and $R_2$ are independently hydrogen, an alkyl or haloalkyl group having from about one to about four carbon atoms, and $a$, $b$, and $c$ are integers, the sum of which is an integer having an average value of from about 3 to about 40;

D

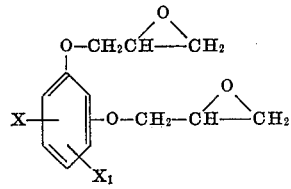

wherein X and $X_1$ are as indicated in Formula B above.

E

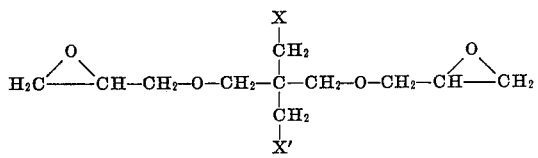

wherein X and X' are independently selected from hydrogen, chlorine and bromine.

F

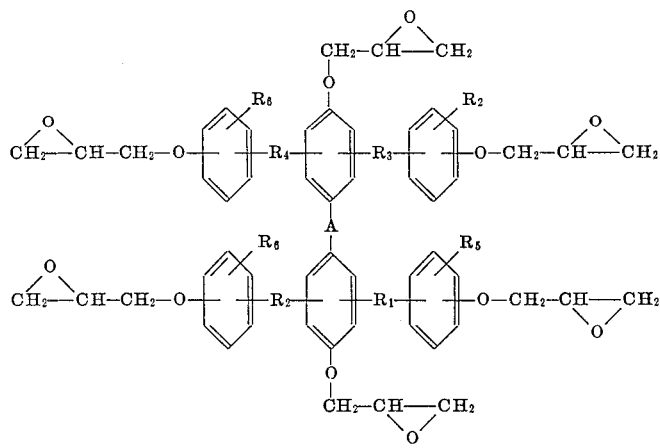

wherein A is a divalent radical selected from the group consisting of alkylidene, cycloalkylidene,

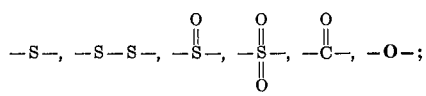

$R_1$, $R_2$, $R_3$ and $R_4$ are independently alkylidene groups and $R_5$, $R_6$, $R_7$ and $R_8$ are independently hydrogen, halogen or alkyl groups having from 1 to about 4 carbon atoms.

G

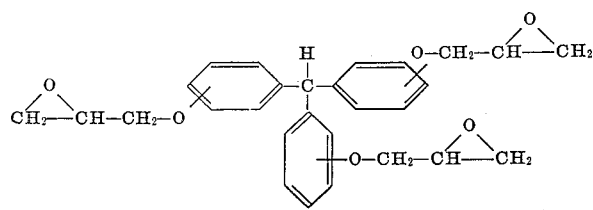

Suitable organic isocyanate or isothiocyanate compounds are the aliphatic and aromatic isocyanates including, for example, phenyl isocyanate; n-butyl isocyanate; octadecylisocyanate; toluene-2,4-diisocyanate; 1,5-naphthalenediisocyanate; cumene-2,4-diisocyanate;4-methoxy-1,3-phenylenediisocyanate; 4-chloro-1,3-phenylenediisocyanate; 4-bromo-1,3-phenylenediisocyanate; 4-ethoxy-1,3-phenylenediisocyanate; 2,4'-diisocyanatodiphenylether; 5,6-dimethyl-1,3-phenylenediisocyanate; 2,4-dimethyl-1,3-phenylenediisocyanate; 4,4'-diisocyanatodiphenylether; benzidinediisocyanate; hexamethylene diisocyanate; 4,6-dimethyl-1,3-phenylenediisocyanate; 9,10-anthracenediisocyanate; 4,4'-diisocyanatodibenzyl; 3,3'-dimethyl-4,4'-diisocyanatodiphenylmethane; 2,6'-dimethyl 4,4'-diisocyanatodiphenyl; 2,4-diisocyanatostilbene; 3,3'-dimethyl-4,4'-diisocyanatodiphenyl; 3,3'-dimethoxy-4,4''-diisocyanatodiphenyl; 1,4-anthracenediisocyanate; 2,5-fluorene-diisocyanate; 1,8-naphthalenediisocyanate; 2,6-diisocyanatobenzfuran; 2,4,6-toluenetriisocyanate; and 2,4,4'-triisocyanatodiphenylether.

Other organic polyisocyanates are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

When polyisocyanates having a functionality above about 2 are employed, they are employed in small quantities in admixture with a diisocyanate.

Also included as useful isothiocyanates are the sulfur analogs of the above mentioned isocyanates.

In the process of the present invention, a vicinal epoxide containing compound is reacted with an organic isocyanate or organic isothiocyanate compound in the presence of a catalytic amount of a phosphonium catalyst at a temperature of from about 130° to about 180°C and preferably from about 150° to about 170°C at pressures of from about 5 mm Hg, absolute, to above atmospheric pressure, preferably from about 5 to about 10 mm Hg, absolute. A co-catalyst comprising a primary or secondary aliphatic alcohol may also be employed in the process of this invention.

A preferred embodiment of the process of this invention comprises reacting an isocyanate or isothiocyanate compound with a stoichiometric quantity of a primary or secondary aliphatic alcohol at a temperature in the range of from about 50° to about 105°C and preferably from about 70° to about 85°C at about atmospheric pressure and reacting the resultant carbamate with a vicinal epoxide at a temperature from about 130° to about 180°C, preferably from about 150° to about 170°C at pressures of from about 5 mm Hg to about 1.1 atm.

The following discussion which pertains to NCO: and NCS:epoxide ratios also pertains to carbamate:epoxide ratios when employed in the process of this invention.

The ratio of isocyanate containing compound to vicinal epoxide containing compound is dependent upon the type of oxazolidinone compound desired. The ratio, however, may range from about 0.1 to 1 to about 1 to 0.1 NCO or NCS equivalents to epoxide,

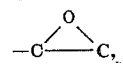

equivalents.

For simple oxazolidinone compounds wherein a monoisocyanate or monoisothiocyanate is reacted with a monoepoxide, the NCO or NCS:epoxide ratio is generally about 1:1.

When products containing one or a multiple of oxazolidinone groups and unreacted isocyanate groups are desired, a compound or mixture of compounds having a plurality of isocyanate groups are reacted with a compound or mixture of compounds having a plurality of vicinal epoxide groups by the process of this invention in proportions such that the NCO: or NCS:epoxide ratio is greater than 1:1.

When products containing one or a multiple of oxazolidinone groups and unreacted epoxide groups are desired, a compound or mixture of compounds having a plurality of isocyanate or isothiocyanate groups are reacted with a compound or mixture of compounds having a plurality of epoxide groups by the process of this invention in proportions such that the NCO: or NCS:epoxide ratio is less than 1:1.

When products containing a plurality of oxazolidinone groups and no unreacted isocyanate or isothiocyanate groups or epoxide groups present are desired, a compound or mixture of compounds containing a plurality of isocyanate or isothiocyanate groups is reacted with a compound or a mixture of compounds containing a plurality of vicinal epoxide groups by the process of this invention in proportions such that the NCO or NCS:epoxide ratio is about 1:1.

In some instances, such as for example, in reacting epoxide containing compounds represented by formula A wherein $n$ has a value of about 2 and above with an isocyanate or isothiocyanate, it is often advantageous to conduct the reaction in the presence of an inert solvent. Suitable inert solvents include for example o-dichlorobenzene, dimethylformamide, nitrobenzene or xylene.

The phosphonium catalysts employed in the process of the present invention may be represented by the general formula

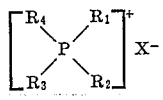

wherein $R_1$, $R_2$, and $R_3$ are independently selected from the group consisting of aliphatic hydrocarbon radicals or substituted aliphatic hydrocarbon radicals having from about one to about 25 carbon atoms, $R_4$ is selected from the same group as $R_1$, $R_2$ and $R_3$ and an aryl or substituted aryl group and wherein X is the anion portion of an inorganic or lower aliphatic carboxylic acid.

Suitable phosphonium catalysts include, for example, methyl tributyl phosphonium iodide, ethyltributyl phosphonium iodide, propyl tributyl phosphonium iodide, tetrabutyl phosphonium bromide, tetrabutyl phosphonium iodide, tetrabutyl phosphonium chloride, tetrabutyl phosphonium hydroxide, tetrabutyl phosphonium acetate acetic acid complex, tetramethyl phosphonium bromide, tetramethyl phosphonium iodide, tetramethyl phosphonium chloride, tetramethyl phosphonium hydroxide, ethyltricyclohexylphosphonium bromide, phenyltributylphosphonium iodide, methyltrioctylphosphonium dimethylphosphate, tetra(3,3-dimethylbutyl)phosphonium chloride.

Other suitable catalysts include the phosphonium salts of an acid, acid ester or ester of an element selected from the group consisting of carbon, nitrogen, phosphorus, sulfur, silicon and boron which may be represented by the general formula

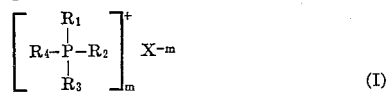

(I)

wherein $R_1$, $R_2$ and $R_3$ are independently selected from the group consisting of hydrogen, aliphatic hydrocarbon radicals containing from about one to about 20 carbon atoms, and radicals represented by the formula $-R_5-Y$ wherein $R_5$ is an aliphatic hydrocarbon radical having from about one to about 20 carbon atoms, and Y is a member selected from the group consisting of Cl, Br, I, $NO_2$, H and OH, $R_4$ is selected from the same group as $R_1$, $R_2$ and $R_3$ and aromatic hydrocarbon radicals and alkyl substituted aromatic hydrocarbon radicals and wherein X is the anion portion of an acid, ester or acid ester of an element selected from carbon, nitrogen, phosphorus, sulfur, silicon and boron and wherein m is the valence of the anion X.

One group of catalysts employed in this invention are the phosphonium salts of an acid of the element nitrogen which are represented by the general formula

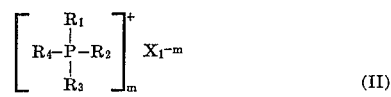

wherein $R_1$, $R_2$, $R_3$ and $R_4$ are as defined in Formula I, $m$ is the valence of the anion $X_1$ and has a value of 1 and wherein $X_1$ is selected from the group consisting of

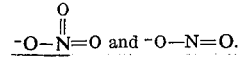

Suitable such phosphonium salts of a nitrogen-containing acid catalyst include, for example, tetrabutyl phosphonium nitrate, tetramethyl phosphonium nitrite and the like.

Another group of catalysts employed in the present invention are the phosphonium salts of an acid, ester, or acid ester of the element phosphorus which are represented by the general formula

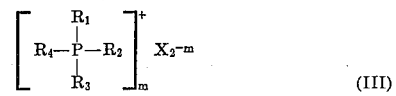

wherein $R_1$, $R_2$, $R_3$ and $R_4$ are as defined in Formula I above wherein $m$ is the valence of the anion $X_2$ and has a value from 1 to 3, and wherein $X_2$ may be represented by the general formulae

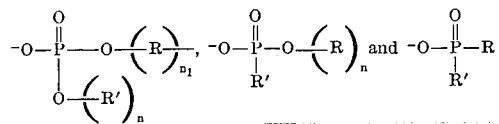

wherein each R and R' are independently selected from the same group as $R_1$, $R_2$, $R_3$ and $R_4$ above and wherein $n$ and $n_1$ independently have values equal to zero or 1.

Suitable such phosphonium salts of a phosphorus containing acid, ester or acid ester catalyst include, for example, tetrabutyl phosphonium diethylphosphate, di(tetrabutylphosphonium)ethylphosphate, tri(tetramethylphosphonium) phosphate, tetramethylphosphonium dimethyl phosphate, methyltrioctylphosphonium dimethylphosphate, methyltributylphosphonium dimethyl phosphonate, ethyltributylphosphonium diphenylphosphinate and the like.

Another group of catalysts employed in the present invention are the phosphonium salts of an acid, ester or acid ester of the element sulfur which are represented by the formula

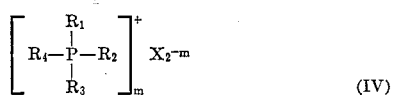

(IV)

wherein $R_1$, $R_2$, $R_3$ and $R_4$ are as defined in Formula I, wherein $m$ is the valence of the anion $X_3$ and has a value from 1 to 2, and wherein $X_3$ is selected from the group represented by the general formulae

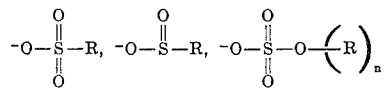

wherein R is independently selected from the same group as $R_1$, $R_2$, $R_3$ and $R_4$ as defined in formula I and wherein $n$ has a value of zero or 1.

Suitable such phosphonium salts of a sulfur-containing acid, ester or acid ester catalysts include, for example, tetramethylphosphonium ethylsulfate, di(tetrabutylphosphonium) sulfate and the like.

Another group of catalysts employed in the present invention are the phosphonium salts of an acid, ester or acid ester of the element silicon which are represented by the general formula

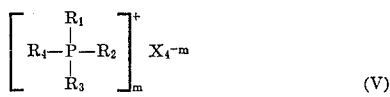

(V)

wherein $R_1$, $R_2$, $R_3$ and $R_4$ are as defined in Formula I, wherein $m$ is the valence of the anion $X_4$ and has a value of from 1–4, and wherein $X_4$ is represented by the general formula

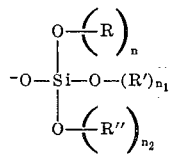

wherein R, R' and R'' are independently selected from the same group as $R_1$, $R_2$, $R_3$ and $R_4$ defined as in formula I and wherein $n$, $n_1$ and $n_2$, independently, have values of zero or 1.

Suitable such phosphonium salts of a silicon containing acid, ester or acid ester catalyst include, for example, tetramethylphosphonium triethylsilicate, di(tetrabutylphosphonium)diethylsilicate, tri(tetramethylphosphonium)ethylsilicate, tetra(tetrabutylphosphonium) silicate and the like.

Another group of catalysts employed in the present invention are the phosphonium salts of an acid, ester or acid ester of the element boron which are represented by the general formula

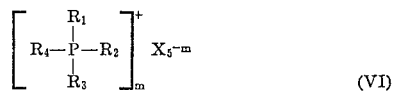

(VI)

wherein $R_1$, $R_2$, $R_3$ and $R_4$ are as defined in Formula I, wherein $m$ is the valence of the anion $X_5$ and has a value of from 1 to 3, and wherein $X_5$ is represented by the general formula

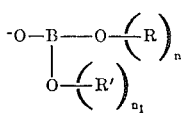

wherein R and R' are independently selected from the same group as $R_1$, $R_2$, $R_3$ and $R_4$ defined in formula I and wherein $n$ and $n_1$ independently have values of zero or 1.

Suitable such phosphonium salts of a boron-containing acid, ester or acid ester catalyst include, for example, tetrabutylphosphonium diethylborate, tetramethylphosphonium dimethylborate, di(tetramethylphosphonium) ethylborate, tri(tetrabutylphosphonium)borate, tetramethylphosphonium dipropylborate and the like.

Another group of catalysts employed in the present invention are the phosphonium salts of an acid, ester or acid ester of the element carbon which are represented by the formula

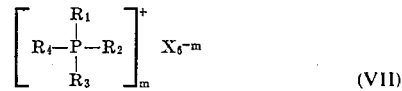

(VII)

wherein $R_1$, $R_2$, $R_3$ and $R_4$ are as defined in Formula I, $m$ is the valence of the anion $X_6$ and has a value of 1–2, and $X_6$ is represented by the formula

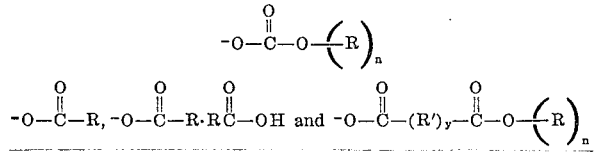

wherein R and R' are independently selected from the same group as $R_1$, $R_2$, $R_3$ and $R_4$ as defined in formula I and R can also be an alkenyl group having from about one to about 20 carbon atoms, and R' can also be an alkenylene group having from about one to about 20 carbon atoms and $n$ has a value equal to zero or 1 and wherein $y$ has a value of zero or 1.

Suitable such phosphonium salts of carbon-containing acid, ester or acid ester catalysts include, for example, tetramethylphosphonium acetate, di(tetrabutylphosphonium) carbonate, triethylphenylphosphonium ethylcarbonate, tributylphenylphosphonium ethyloxalate, di(tetramethylphosphonium) oxalate and the like.

In some instances, the phosphonium salts of a carboxylic acid employed as catalysts herein may contain some acid-salt complex without significantly adversely affecting the catalytic activity of the catalyst. In these instance, the catalyst complex may be represented by the general formula

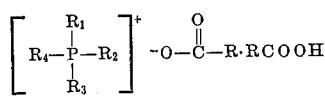

wherein R, $R_1$, $R_2$, $R_3$ and $R_4$ are as defined in formula VII.

The phosphonium catalysts employed in the present invention are commercially available compounds and general procedures and references for their preparation are given in Organo Phosphorus Compounds, by G. M. Kosolapoff, John Wiley & Sons, 1958.

Another class of catalysts which may be employed in the process of the present invention are the internal phosphonium salts (phosphobetaines) represented by the general formula

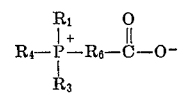

or when $R_6$ has about 3 carbon atoms by the formula

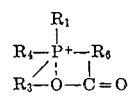

wherein $R_1$, $R_3$ and $R_4$ are as previously defined, and $R_6$ is an alkylene group having from about two to about 20 carbon atoms.

The internal phosphonium salts known as phosphobetaines may be prepared by the procedure outlined in the Journal of Organic Chemistry, Vol. 27, pp. 3403–3408, published in 1962.

Suitable such phosphobetaines include, for example, trimethylpropiophosphobetaine, tributylbutyrophosphobetaine, and the like.

Compounds having more than 1 phenyl or aromatic group in the cation portion of the phosphonium compounds are not effective as a catalyst for promoting the isocyanate- or carbamate-epoxide reaction to form the oxazolidinone structure.

Suitable aliphatic primary or secondary alcohols which may be employed as a co-catalyst with the phosphonium compound or reacted with the isocyanate containing compound to form a carbamate include, for example, methanol, ethanol, n-propyl alcohol, n-butyl alcohol, n-hexyl alcohol, secondary butyl alcohol, isopropyl alcohol, amyl alcohol, isoamyl alcohol, mixtures thereof, and the like.

The following examples are illustrative of the present invention but are not to be construed as limiting the scope thereof in any manner.

EXAMPLE 1

To a suitable reaction vessel equipped with a stirrer, temperature control means, means for providing a nitrogen purge and means for applying a vacuum, was charged 100 grams of DEN 438, a commercially available epoxidized phenol-formaldehyde novolac resin having an average epoxide functionality of about 3.5 and an epoxide equivalent weight of 181. After degassing the resin at 110°C and 5 mm Hg pressure for about 15 minutes, cooling to 50°C and releasing the vacuum by applying a nitrogen pad, 3.5 grams of anhydrous methanol and 9.52 grams of toluene diisocyanate (an 80/20 mixture by weight of the 2,4- and 2,6-isomers, respectively) were added. The temperature was then raised to 85°C and maintained thereat for about 1½ hours to convert the isocyanate groups to carbamate groups. After the addition of 0.10 gram tetrabutyl phosphonium bromide catalyst, the temperature was raised to 150°C and maintained thereat under a vacuum to aid in the removal of the methanol released during oxazolidinone formation until about 95 percent of the carbamate groups were converted to oxazolidinone groups. This was determined by following the disappearance of the carbamate groups which give an infrared band at 1,730 hz and a corresponding deepening of the oxazolidinone band at 1,755 hz, by periodic infrared analysis of the contents of the reaction vessel. The resultant oxazolidinone modified epoxy novolac resin was a clear, light yellow solid having a Durran softening point of about 87°C and a percent epoxide of about 17.2.

EXAMPLE 2

To a reaction vessel fitted with agitator, thermometer, and means for applying vacuum and purging with nitrogen gas, was added 200 grams (1.270 epoxide equivalents) of the triglycidyl ether of 4,4',4''-trihydroxy triphenylmethane. After degassing the resin under vacuum at 115°C, the vacuum was released using nitrogen. After cooling the resin to 60°C, 6.8 grams of methanol was added followed by the addition of 15.68 grams (0.180 NCO equivalents) of toluene diisocyanate (80/20 mixture by weight of the 2,4- and 2,6-isomers). The temperature was raised to 85°C and after 1½ hours, the toluene diisocyanate had reacted with the methanol to form the corresponding carbamate as noted by the disappearance of isocyanate groups by infrared analysis. The temperature was then raised to 145°C, and 100 mg. (500 ppm) of tetrabutylphosphonium bromide was added. The temperature was maintained at 155°C for 3 hours. The temperature was then raised to 185°C for 1 hour. The resultant clear, deep red, solid product had an epoxide content of 20.3 percent and a Durran's softening point of 70°C. Infrared analysis indicated the presence of the desired oxazolidinone groups.

A molding composition was then formulated according to the following recipe.

60 grams of the product prepared above.
14.05 grams methylene dianiline
48.0 grams ASP 400 clay filler
2.4 grams zinc stearate
1.2 grams resorcinol The specimens of the above formulation cured at 300°F for 4 minutes has a heat distortion temperature of 390°F and when post cured at 200°C for 16 hours, the heat distortion temperature was 437°F. The above formulation had a spiral flow value of >105 inches when tested at 300°F and 250 psi for 3 minutes employing the procedure described on pp. 104–108 of Modern Plastics, Feb. 1968.

The following example, provided for comparative purposes, demonstrates that a phosphonium compound having a plurality of phenyl groups attached to the phosphorous atom is ineffective as a catalyst in the process of this invention.

EXAMPLE 3

To a reaction vessel equipped with a stirrer, temperature control means, means for providing a nitrogen purge and means for applying a vacuum, was charged 100 grams of DEN 438, an epoxidized phenol-formaldehyde novolac resin having an average epoxide functionality of about 3.5. After degassing the resin at 110°C. and 5 mm Hg pressure for about 15 minutes, and releasing the vacuum by applying a nitrogen pad, the resin was heated to 140°C. and 0.05 grams of ethyltriphenylphosphonium iodide was added. Then toluene diisocyanate was introduced dropwise until a total of 3 cc (3.6 grams) had been added over a time interval of about 8 minutes. The reaction mixture was then held at 135° to 150°C. for an additional 2 hours. At this time the isocyanate had been converted almost completely to carbamate but there was no indication of further reaction of carbamate with epoxide to form oxazolidinone. The epoxide content had not decreased from the value in the original mixture; nor was there any evidence of the characteristic oxazolidinone band at the 1,755 hz infrared spectra. Therefore the ethyltriphenyl phosphonium iodide catalyst was deemed inactive in promoting the desired reaction. Also, the mixture did not thicken or give any indication of becoming a solid at room temperature.

EXAMPLE 4

A steam jacketed reaction kettle, equipped with an agitator and with means for applying a vacuum and a nitrogen purge, was charged with 25 pounds of the diglycidyl ether of 4,4'-isopropylidine diphenol having an epoxide equivalent weight of 189. This was degassed at 100°C. and 5 mm Hg pressure for about 15 minutes and then cooled to 50°C. The vacuum was then released by applying a nitrogen pad. Addition of 2.0 pounds of anhydrous methanol and 4.6 pounds of toluene diisocyanate (an 80/20 mixture by weight of the 2,4- and 2,6-isomers respectively) was made at 50°C. and the exotherm upon reaction between the two raised the temperature to 80°C. where it was held for about 1 hour. After addition of 11 grams (0.025 pounds) of tetrabutyl phosphonium bromide, the temperature was raised to 145°–150°C. and held for 4 hours. During the last 3 hours a vacuum of at least 28 inches Hg was applied to aid in the removal of the methanol released during oxazolidinone formation. At the end of the reaction time above an infrared spectogram showed substantially complete conversion (over 95 percent) of the carbamate to oxazolidinone and the product was thereupon withdrawn from the kettle.

The product analyzed 10.1 percent epoxide and had a Durran softening point of 97°C. The softening point is comparable to that for DER 664 (a solid epoxy resin made from the diglycidyl ether of 4,4'-isopropylidine diphenol having an epoxide equivalent weight of about 189.) A comparison between these two resins when cured in a molding compound formulation using methylene dianiline hardener in stoichiometric proportions is shown below. The formulation also contained 80 parts clay filler per 100 parts of resin.

|  | Oxazolidinone Resin of Ex. 3 | DER 664 |
|---|---|---|
| % Epoxide | 10.1% | 4.65% |
| Softening Point | 97°C | 98°C |
| Heat Deflection Temp. | 263°F | 190°F |
| Flexural Strength | 15000 psi | 13900 psi |
| Flexural Modulus | $7.3 \times 10^5$ psi | $6.5 \times 10^5$ |
| Izod Impact Strength | 0.30 ft-lb/inch | 0.30 |

EXAMPLE 5

This is an example for preparation of a high molecular weight thermoplastic resin from a diepoxide plus diisocyanate. To a reaction vessel similar to that in example 1 was added 35.2 grams (1.1 equivalent) of anhydrous methanol. To this was added 65 grams of dimethylformamide solvent plus 87 grams (1.0 equivalent) of toluene diisocyanate (an 80/20 mixture by weight of the 2,4- and 2,6-isomers respectively). The latter was added at a rate to keep the temperature below 60°C. Towards the end of the addition, 77 grams of the diglycidyl ether of 4,4'-isopropylidine diphenol having an epoxide equivalent weight of about 172 was added to keep in solution the carbamate product being formed. After addition of the toluene diisocyanate, the mixture was heated to 70°C for 1 hour after which reaction was essentially complete as verified by disappearance of the isocyanate band in the infrared spectrograms. The remainder of the diglycidyl ether of 4,4'-isopropylidine diphenol, for a total of 172 grams (1.0 equivalent) was added, plus 0.2 grams of tetrabutyl phosphonium bromide catalyst. The reaction mixture was heated to 155°C and held at this temperature for 4½ hours. The methanol that was released during this reaction time was allowed to distil out of the system. At the end of this reaction period 324 grams of dimethylformamide solvent was added and the reaction mixture cooled to room temperature. Analysis of the product showed, on a solvent-free basis, 1.2 percent epoxide. Infrared analysis showed that the reaction product contained the desired oxazolidinone groups. A small percentage of the added isocyanate was shown by infrared analysis to be in the trimer form, comprising a six-member substituted cyanurate ring structure. This accounts for the lack of completion of reaction with the epoxide.

To recover the polymer after analysis, the solution in dimethylformamide was fed slowly into a well-agitated methanol bath. The resin precipitated out as a white powder that was washed with fresh methanol, filtered, and dried under vacuum. The average molecular weight of this polymer was in the range of 10,000 or greater, and the softening point was about 180°C.

What is claimed is:

1. A process for preparing oxazolidinone containing compounds, said process comprising reacting a vicinal epoxide with an organic isocyanate or organic isothiocyanate in the presence of a catalytic amount of a phosphonium catalyst and a primary or secondary aliphatic alcohol, said phosphonium catalyst being represented by the general formula,

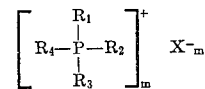

wherein $R_1$, $R_2$ and $R_3$ are independently selected from the group consisting of hydrogen, aliphatic hydrocarbon radicals containing from about one to about 20 carbon atoms, $R_4$ is selected from the same group as $R_1$, $R_2$ and $R_3$ and aromatic hydrocarbon radicals and alkyl substituted aromatic hydrocarbon radicals and wherein X is Cl, Br, I or the anion portion of an acid, ester or acid ester of the element carbon, and wherein $m$ is the valence of the anion X.

2. The process of claim 1 wherein the NCO: or NCS:epoxide ratio is from about 0.1:1 to about 1:0.1.

3. The process of claim 2 wherein the isocyanate or isothiocyanate is a diisocyanate or diisothiocyanate and the vicinal epoxide is a polyepoxide having a functionality greater than 1.

4. A process for preparing oxazolidinone containing compounds, said process comprising reacting a vicinal epoxide containing compound with a carbamate formed by the reaction of an isocyanate or isothiocyanate containing compound with a primary or secondary aliphatic alcohol in an isocyanate or isothiocyanate to OH ratio of about 1:1, said epoxide-carbamate reaction being conducted in the presence of a catalytic amount of a phosphonium catalyst, represented by the general formula,

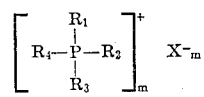

wherein $R_1$, $R_2$ and $R_3$ are independently selected from the group consisting of hydrogen, aliphatic hydrocarbon radicals containing from about one to about 20 carbon atoms, $R_4$ is selected from the same group as $R_1$, $R_2$ and $R_3$ and aromatic hydrocarbon radicals and alkyl substituted aromatic hydrocarbon radicals and wherein X is Cl, Br, I or the anion portion of an acid, ester or acid ester of the element carbon and wherein $m$ is the valence of the anion X.

5. The process of claim 4 wherein the ratio of carbamate groups to vicinal epoxide groups is from about 0.1:1 to about 1:0.1.

6. The process of claim 5 wherein the ratio of carbamate group to vicinal epoxide groups is from about 0.1:1 to about 0.5:1.

7. The process of claim 6 wherein the isocyanate employed in the preparation of the carbamate is a diisocyanate and the vicinal epoxide containing compound has an average epoxide functionality greater than about 1.

8. The process of claim 7 wherein the vicinal epoxide containing compound is an epoxy resin represented by the general formula

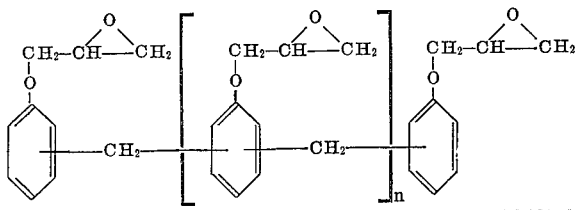

wherein $n$ has a value from about 0.1 to about 4.

9. The process of claim 1 wherein the catalyst is a phosphonium compound represented by the general formula,

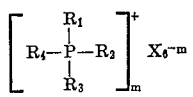

wherein $R_1$, $R_2$, $R_3$ and $R_4$ are as defined in Claim 1, $m$ is the valence of the anion $X_6$ and has a value of 1 to 2, and $X_6$ is represented by the formula,

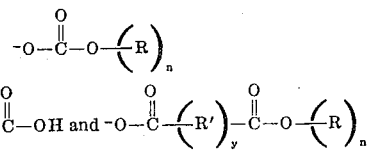

wherein R and R' are independently selected from the same group as $R_1$, $R_2$, $R_3$ and $R_4$ as defined in claim 1 and R can also be an alkenyl group having from about one to about 20 carbon atoms, and R' can also be an alkenylene group having from about one to about 20 carbon atoms and $n$ has a value equal to zero or 1 and wherein $y$ has a value of zero to 1.

10. The process of claim 4 wherein the catalyst is a phosphonium compound represented by the general formula,

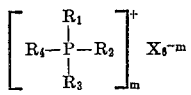

wherein $R_1$, $R_2$, $R_3$ and $R_4$ are as defined in Claim 4, $m$ is the valence of the anion $X_6$ and has a value of 1 to 2, and $X_6$ is represented by the formula,

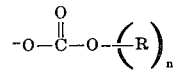

wherein R and R' are independently selected from the same group as $R_1$, $R_2$, $R_3$ and $R_4$ as defined in claim 4 and R can also be an alkenyl group having from about one to about 20 carbon atoms, and R' can also be an alkenylene group having from about one to about 20 carbon atoms and $n$ has a value equal to zero or 1 and wherein $y$ has a value of zero to 1.

* * * * *